July 12, 1927.
J. SOKOLOV
1,635,228
SPARE TIRE LOCK
Filed May 3, 1926
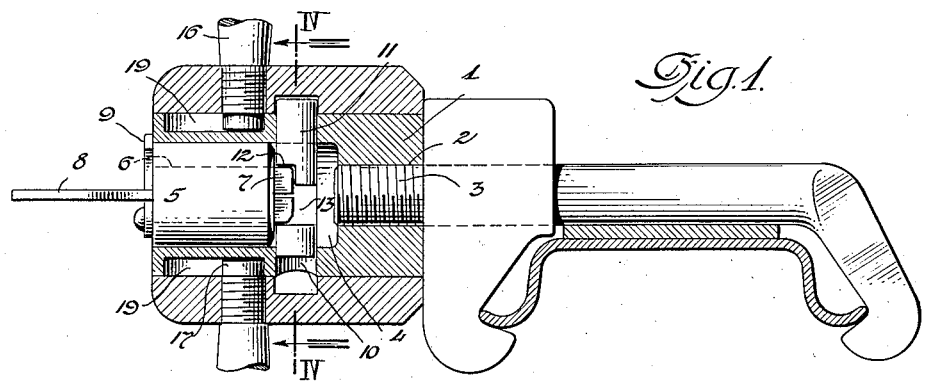
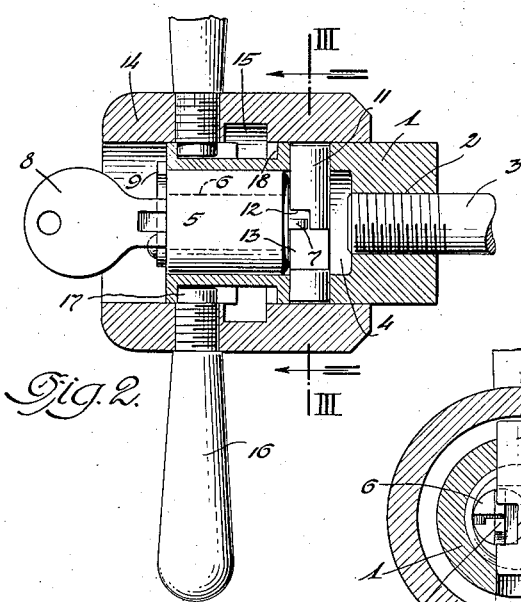
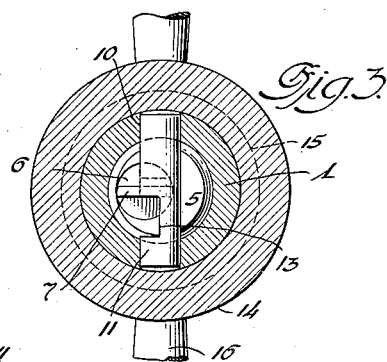
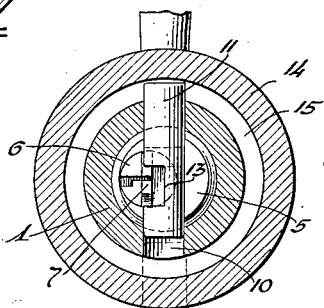
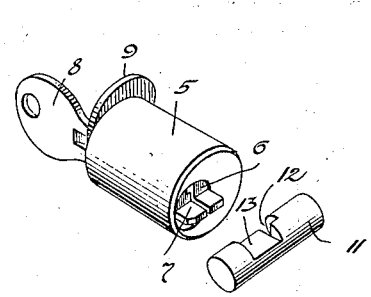
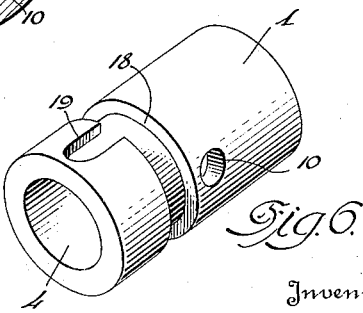
Inventor:
Jacob Sokolov
By
Attorneys.

Patented July 12, 1927.

1,635,228

UNITED STATES PATENT OFFICE.

JACOB SOKOLOV, OF DETROIT, MICHIGAN.

SPARE-TIRE LOCK.

Application filed May 3, 1926. Serial No. 106,227.

The primary object of my invention is to provide a locking mechanism for a rotatable member, as a nut, so that the nut cannot be surreptitiously removed from a bolt, stud or other supporting member on which it is secured. Such a locking mechanism may be advantageously used in connection with a spare tire carrier on which a tire, tire equipped rim or other device is detachably mounted and retained thereon by a clip, clamp or other gripping device held in place by a detachable nut. It is a well known fact that such nuts are often removed and the tire stolen, and to eliminate this nefarious practice I have designed my locking mechanism to fit over the nut and be freely rotatable thereon, so that a wrench or other tool cannot conveniently grip the nut for its removal.

Another object of this invention is to provide a locking mechanism embodying inner and outer rotatable members with the outer member reciprocable relative to the inner member and in one position free to revolve on the inner member. In another position the outer member is operatively connected to the inner member to permit of both members being rotated, such being the condition of said members for removal of the inner member from a support to which it may be attached.

A still further object of this invention is to provide a durable, inexpensive and compact locking mechanism and this mechanism will be hereinafter specifically described and then claimed.

Reference will now be had to the drawing, wherein

Figure 1 is a longitudinal sectional view of the locking mechanism in connection with a spare tire carrier, the mechanism being in a locked position;

Fig. 2 is a similar view showing the mechanism in an unlocked position;

Fig. 3 is a cross sectional view taken on the line III—III of Fig. 2;

Fig. 4 is a cross sectional view taken on the line IV—IV of Fig. 1;

Fig. 5 is a perspective view of a bolt and lock barrel adapted to form part of the mechanism, and Fig. 6 is a perspective view of an inner member or nut.

In the drawing, the reference numeral 1 denotes a cylindrical inner member or nut having a bore 2 with its walls screw-threaded so that it may be screwed on the end of a bolt, stud or other member 3 which is shown in Fig. 1 as forming part of a clamping or gripping device for retaining a rim or tire on a carrier. There are various forms of tire carriers which include a threaded stud or bolt and for this reason I do not care to confine my invention to the type of member on which the rotatable member 1 is mounted.

The cylindrical member 1 is of greater length than an ordinary nut and has its outer end provided with a recess 4 in which is fixed a lock body 5 having a rotatable barrel 6 with its inner end provided with a lug or tang 7. The body 5 and the barrel 6 represent a conventional form of key operated tumbler lock, the outer end of the barrel 6 having a keyhole for a key 8 and the keyhole may be closed, when the key is removed by a guard 9. The key 8 is adapted to actuate tumblers which release the barrel 6 for rotation relative to the body 5, and there are various types of key operated locks that may be mounted in the outer end of the inner member 1 to serve my purpose.

Communicating with the inner end of the recess 4 are diametrically opposed openings 10 and reciprocable in these openings is a bolt 11 having communicating notches 12 and 13. The barrel lug 7 protrudes into the bolt notch 12, as shown in Fig. 2, and may be turned into the notch 13, as shown in Fig. 1. The turning of the barrel lug 7 causes reciprocation of the bolt 11 and as shown in Fig. 1 an end of the bolt protrudes from the inner member 1, while in Fig. 2 the bolt is within the inner member 1.

Rotatable and reciprocable on the smooth cylindrical outer wall of the inner member 1 is an outer member or casing 14 having its inner wall provided with an annular groove 15 into which is adapted to extend an end of the bolt 11 to prevent reciprocation of the outer member or casing 14 on the inner member or nut 1, yet permit of the outer member being freely revolved relative to the inner member. This condition of the inner and outer members is shown in Fig. 1 and since the outer member is free to revolve it is practically impossible to obtain a grip on the inner member for removing it from the bolt or stud 3.

Between the groove 15 and the outer end of the member or casing 14 are diametrically opposed handles 16 which are fixed in the outer member or casing 14 and have the inner ends thereof provided with projections 17 adapted to engage in an annular groove 18 in the inner member or nut 1. Communicating with this annular groove, as best shown in Figs. 1 and 6 are longitudinal grooves 19 which are also adapted to receive the projections 17, as shown in Fig. 2. It is by means of these projections engaging in the longitudinal grooves 19 that a connection is established between the inner and outer members so that the outer member may be employed for rotating the inner member. This connection is conditioned by retraction of the bolt 11 and reciprocation of the outer member or casing 14 on the inner member or nut 1, otherwise, as shown in Fig. 1, the outer member may be freely rotated about the inner member, because the bolt 11 extends into the groove 15 and the projections 17 extend into the groove 18. Such is a locked condition of the inner member or nut 1 and to remove the same the key 8 must be used to retract the bolt 11. Then the outer member or casing 14 must be turned so that the projections 17 may enter the longitudinal grooves 19 by shifting the outer member or casing 14 outwardly. The outer casing or member 14 can then be used for rotating the inner member or nut 1 as a connection has been established between the members.

In some instances the handles 16 may be dispensed with, the projections 17 otherwise fixed in the outer member 14, and the periphery of said member provided with facets or a roughened surface to facilitate rotation.

It is thought that the utility of my invention will be apparent without further description, and while in the drawing there is illustrated a preferred embodiment of my invention, it is to be understood that the structural elements are susceptible to such variations and modifications as fall within the scope of the appended claims.

What I claim is:—

1. A lock comprising inner and outer rotatable and reciprocable members, retractable means holding said members against reciprocation relative to each other and permitting one member to freely rotate relative to the other, and a connection between said members conditioned by reciprocation of one member relative to the other to hold said members for rotation in synchronism so that one of said members may be attached to a support.

2. The combination of a nut, a casing rotatable and reciprocable on said nut, retractable means in said nut holding said casing for free rotation on said nut and preventing reciprocation of said casing on said nut until said means is retracted relative to said casing, and means carried by said casing and conditioned relative to said nut by reciprocation of said casing to establish a connection between said nut and casing for rotation in synchronism.

3. The combination called for in claim 2, wherein the last mentioned means includes handles on said casing extending into said nut.

4. The combination of a nut having an annular groove therein, a reciprocable casing on said nut, projections carried by said casing engaging in said nut and in one position of said casing on said nut permitting rotation of said casing on said nut and in another position securing said casing for rotation with said nut, and means carried by said nut adapted to maintain the first mentioned position of said casing.

5. The combination called for in claim 4, wherein said projections are carried by opposed handles mounted in said casing.

In testimony whereof I affix my signature.

JACOB SOKOLOV.